Oct. 15, 1940.   E. C. BURDICK ET AL   2,217,657
PEN FOR RECORDERS
Filed Jan. 10, 1940

INVENTOR
EDWIN CLARK BURDICK
COLEMAN B. MOORE
BY JONATHAN SHARP
ATTORNEY

Patented Oct. 15, 1940

2,217,657

UNITED STATES PATENT OFFICE 2,217,657

PEN FOR RECORDERS

Edwin Clark Burdick, Philadelphia, Coleman B. Moore, Carroll Park, and Jonathan Sharp, Philadelphia, Pa., assignors to The Brown Instrument Company, Philadelphia, Pa., a corporation of Pennsylvania Application January 10, 1940, Serial No. 313,254

2 Claims. (Cl. 120—43)

The present invention relates to pen and more particularly to recording pens of the so-called "V-type" that are used for making a record of the value of a variable condition on the chart of a recording instrument.

In pens of this type that have previously been used trouble has been encountered in the feeding of the ink from the body of the pen to the writing tip. This invention serves to overcome this difficulty by providing a member which operates to feed the ink from the body of the pen to the tip thereof by capillary action.

It is an object of our invention to provide a pen for recording instruments which will make a record that is smooth and clear by virtue of a free and continuous flow of ink to the writing tip thereof.

It is another object of our invention to make a recording pen that will supply ink to the chart in any position of the pen as it is moved to various points across the chart.

Another object of the invention is to provide a recording pen in which the writing tip may be higher than the body of the pen and in which substantially all of the ink in the pen is drawn by capillary action to the writing tip.

A further object of our invention is to provide a recording pen that is simple in construction and in which "flooding" encountered heretofore in recording pens is obviated.

A still further object of the invention is to provide a recording pen of the so-called "V-type" in which splashing of the ink on jarring or other disturbance of the pen is eliminated.

The various features of novelty which characterize our invention are pointed out with particularity in the claims annexed to and forming a part of this specification. For a better understanding of the invention, however, its advantages and specific objects obtained with its use, reference should be had to the accompanying drawing and descriptive matter in which we have illustrated and described a preferred embodiment of the invention.

There is shown a pen 1 of a general diamond cross section that is supported by an arm 2 which is adapted to be attached to the pen arm of a recording instrument in any usual manner. The pen is extended forwardly as at 3 and has its writing tip in the form of a capillary tube 4 that is formed integral with the body thereof. The entire pen is made from a single piece of sheet metal that is stamped into the proper shape and bent to form.

Figure 1:
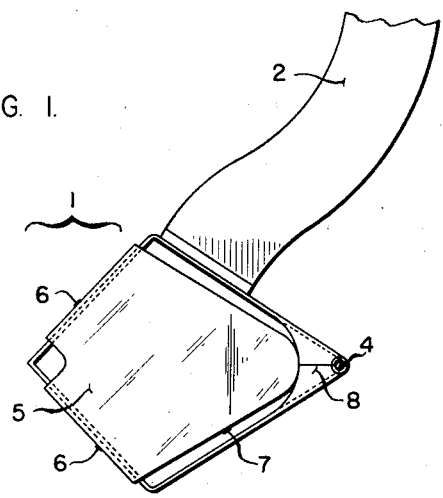
Fig. 1 is a front view of the pen.
Figure 2:
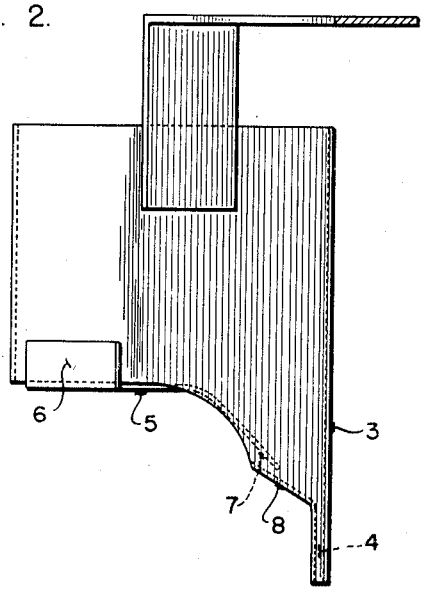
Fig. 2 is a side view thereof.

A baffle plate 5 is formed with bent-over wing members 6 and is attached as shown to the front of the pen. The lower part 7 of this baffle plate is not in engagement with the sides of the pen but is spaced slightly therefrom as is best shown in Figure 1. The portion 7 of the baffle is, as shown in Figure 2, slightly inside the front edges of the pen body. This portion also stops short of the curved-over edges 8 of the body portion that form in effect a funnel shaped portion leading to the capillary writing tip 4.

In the operation of the pen it is generally mounted as shown in Fig. 1 of the drawing with the body portion lower than the writing tip and for that reason difficulty has heretofore been encountered in getting the ink to feed upwardly to the writing tip. The present invention overcomes this trouble. After the pen is mounted in place on its supporting arm a few drops of ink are placed in the body portion, and through capillary action are drawn to the tip of the pen to make a record line on a chart. The ink is placed far enough forward so that it is in engagement with the plate 5. Capillary action of the ink between the edges of the portion 7 of the baffle 5 and the sides of the pen body draw the ink up into the funnel portion 8 from which it is fed forward through the tube portion 4.

With this construction the ink is maintained by its surface tension in what amounts to a pocket and is smoothly fed to the writing tip by capillary action of the ink between the edges of the pen body and baffle and through the capillary tip 4.

This simple construction in a pen for a recording instrument has proven in practice to be superior to other pens of this type in that it will hold a larger amount of ink than usual and will feed the ink to a chart to make a smooth record line. Another advantageous characteristic of the recording pen described herein is that it will feed substantially all of the ink to the writing tip even though the writing tip is maintained at a higher level than the body portion of the pen. The feature of our invention which permits the pen to be positioned with the writing tip at a higher level than the body portion is practically important in that flooding experienced with known types of pens, due to the pressure head of the ink when the writing tip is maintained at a lower level than the main body portion of the pen, is eliminated. Furthermore, by placing the baffle member 5 over the normally open front of the pen body, ink is prevented from being thrown from the pen over the chart on jarring or other disturbance of the pen.

While in accordance with the provisions of the statutes, we have illustrated and described the best form of our invention now known to us, it will be apparent to those skilled in the art that changes may be made in the form of the apparatus disclosed without departing from the spirit of our invention as set forth in the appended claims, and that in some cases certain features of our invention may sometimes be used to advantage without a corresponding use of other features.

Having now described our invention, what we claim as new and desire to secure by Letters Patent is:

1. A pen for a recording instrument comprising a body portion of angular shape, one corner thereof extending to form a writing tip, a plate attached to the end of said body portion and having an extension that projects toward said writing tip, the sides of said extension being separated from said body portion.

2. A pen for recording instruments comprising a hollow, angularly shaped body open at both ends, one corner of said body extending outwardly therefrom and being formed into a writing tip, a baffle plate attached to the end of said body portion from which the writing tip extends, the sides of said plate being spaced from but closely adjacent the edges of said body portion.

EDWIN CLARK BURDICK.
COLEMAN B. MOORE.
JONATHAN SHARP.